(12) United States Patent
Kessler et al.

(10) Patent No.: US 8,827,219 B2
(45) Date of Patent: Sep. 9, 2014

(54) QUICK RELEASE PLATE

(71) Applicant: Kessler Crane, Inc., Plymouth, IN (US)

(72) Inventors: Erin Kessler, Bremen, IN (US);
Richard Eggink, Granger, IN (US);
Kevin P. Mott, Bremen, IN (US)

(73) Assignee: Kessler Crane, Inc., Plymouth, IN (US)

( * ) Notice: Subject to any disclaimer, the term of this patent is extended or adjusted under 35 U.S.C. 154(b) by 9 days.

(21) Appl. No.: 13/711,912

(22) Filed: Dec. 12, 2012

(65) Prior Publication Data
US 2014/0093314 A1    Apr. 3, 2014

Related U.S. Application Data

(63) Continuation-in-part of application No. 13/316,059, filed on Dec. 9, 2011.

(51) Int. Cl.
*F16M 11/04* (2006.01)
*G03B 17/00* (2006.01)
*F16M 13/00* (2006.01)
*G03B 17/56* (2006.01)
*F41G 11/00* (2006.01)
*F16M 11/16* (2006.01)

(52) U.S. Cl.
CPC ........ *G03B 17/561* (2013.01); *F16M 2200/028* (2013.01); *F16M 11/048* (2013.01); *F16M 13/00* (2013.01); *F16M 11/041* (2013.01); *F41G 11/003* (2013.01); *F16M 11/16* (2013.01)
USPC ................ 248/187.1; 248/224.7; 248/222.13; 248/224.51; 248/346.06; 396/428

(58) Field of Classification Search
CPC ............... F41G 11/003; F16M 11/041; F16M 2200/028; F16M 11/16; F16M 11/048; F16M 13/00; G03B 17/561
USPC ............................ 248/178.1, 187.1; 396/428
See application file for complete search history.

(56) References Cited

U.S. PATENT DOCUMENTS

| 2,174,860 | A |   | 10/1939 | Montgomery et al. |
| 2,756,956 | A | * | 7/1956 | Anderson .................. 248/178.1 |
| 2,824,504 | A |   | 2/1958 | Bethmann |
| 2,905,427 | A |   | 9/1959 | Roeder |
| 3,006,052 | A |   | 10/1961 | Stickney et al. |
| 3,612,462 | A | * | 10/1971 | Mooney et al. ............ 248/316.4 |
| 4,057,816 | A |   | 11/1977 | Killian, Jr. et al. |
| 4,466,595 | A | * | 8/1984 | O'Connor .................... 248/558 |
| 4,929,973 | A | * | 5/1990 | Nakatani .................... 248/177.1 |
| 5,005,813 | A |   | 4/1991 | Lawrence |
| 5,230,490 | A |   | 7/1993 | Sloop |

(Continued)

FOREIGN PATENT DOCUMENTS

| EP | 1375060 | 1/2004 |
| KR | 10-2007-0078460 | 8/2007 |
| WO | WO0196070 | 12/2001 |

*Primary Examiner* — Jonathan Liu
*Assistant Examiner* — Chiedu Chibogu
(74) *Attorney, Agent, or Firm* — Botkin & Hall, LLP

(57) ABSTRACT

A mounting system having a plate with a tail portion and a base with a socket portion. The socket includes a dropping gate which recedes into a compartment in the base when the plate is vertically inserted on the base. The base includes a stop which engages a catch on the plate to prevent the plate from being laterally removed from the base.

14 Claims, 19 Drawing Sheets

(56) References Cited

U.S. PATENT DOCUMENTS

| | | | |
|---|---|---|---|
| 5,375,361 A * | 12/1994 | Rustick | 42/125 |
| 5,397,086 A * | 3/1995 | Chen | 248/183.2 |
| 5,429,332 A * | 7/1995 | Ishikawa | 248/187.1 |
| 5,816,300 A | 10/1998 | Rogers | |
| 5,870,641 A | 2/1999 | Chrosziel | |
| 6,196,504 B1 | 3/2001 | Lemke | |
| 6,234,690 B1 | 5/2001 | Lemieux | |
| 6,364,259 B1 | 4/2002 | Boudard | |
| 6,435,738 B1 * | 8/2002 | Vogt | 396/419 |
| 6,736,383 B2 | 5/2004 | Kohlert | |
| 6,739,559 B2 | 5/2004 | Nakatani | |
| 6,773,172 B1 | 8/2004 | Johnson et al. | |
| 6,922,934 B1 * | 8/2005 | Huan | 42/127 |
| 6,994,504 B2 | 2/2006 | Gordon | |
| 7,077,582 B2 * | 7/2006 | Johnson | 396/428 |
| 7,185,862 B1 * | 3/2007 | Yang | 248/187.1 |
| 7,287,731 B2 | 10/2007 | Johnson | |
| 7,370,449 B1 * | 5/2008 | Beckmann | 42/90 |
| 7,562,485 B2 * | 7/2009 | Newhall et al. | 42/127 |
| 7,584,946 B2 | 9/2009 | Doi | |
| 7,658,556 B2 | 2/2010 | Johnson | |
| 7,828,256 B2 * | 11/2010 | Speggiorin | 248/187.1 |
| 7,857,020 B2 | 12/2010 | McDaniel | |
| 8,025,455 B2 | 9/2011 | Huang et al. | |
| 8,282,055 B2 * | 10/2012 | Burklin | 248/187.1 |
| 8,336,246 B1 * | 12/2012 | Barber | 42/127 |
| 8,438,965 B2 * | 5/2013 | Collin et al. | 89/125 |
| 2004/0146293 A1 | 7/2004 | DeSorbo et al. | |
| 2008/0034638 A1 * | 2/2008 | Spuhr | 42/127 |
| 2010/0310250 A1 | 12/2010 | McAnulty | |
| 2011/0042535 A1 * | 2/2011 | Cheng | 248/298.1 |
| 2011/0167703 A1 | 7/2011 | Deros | |
| 2011/0198464 A1 | 8/2011 | Hoge | |

* cited by examiner

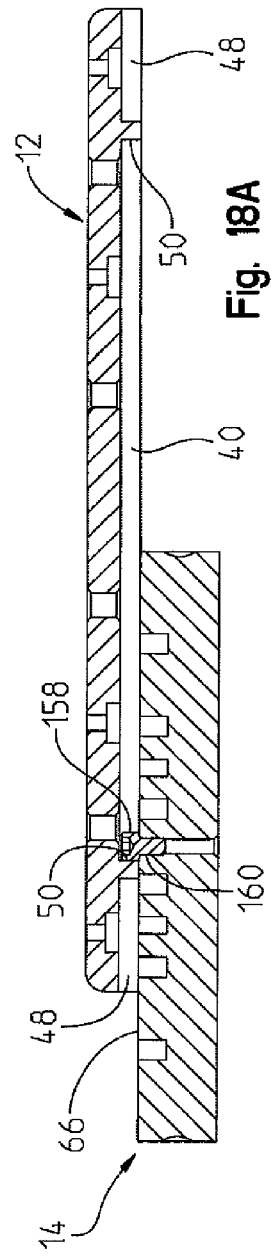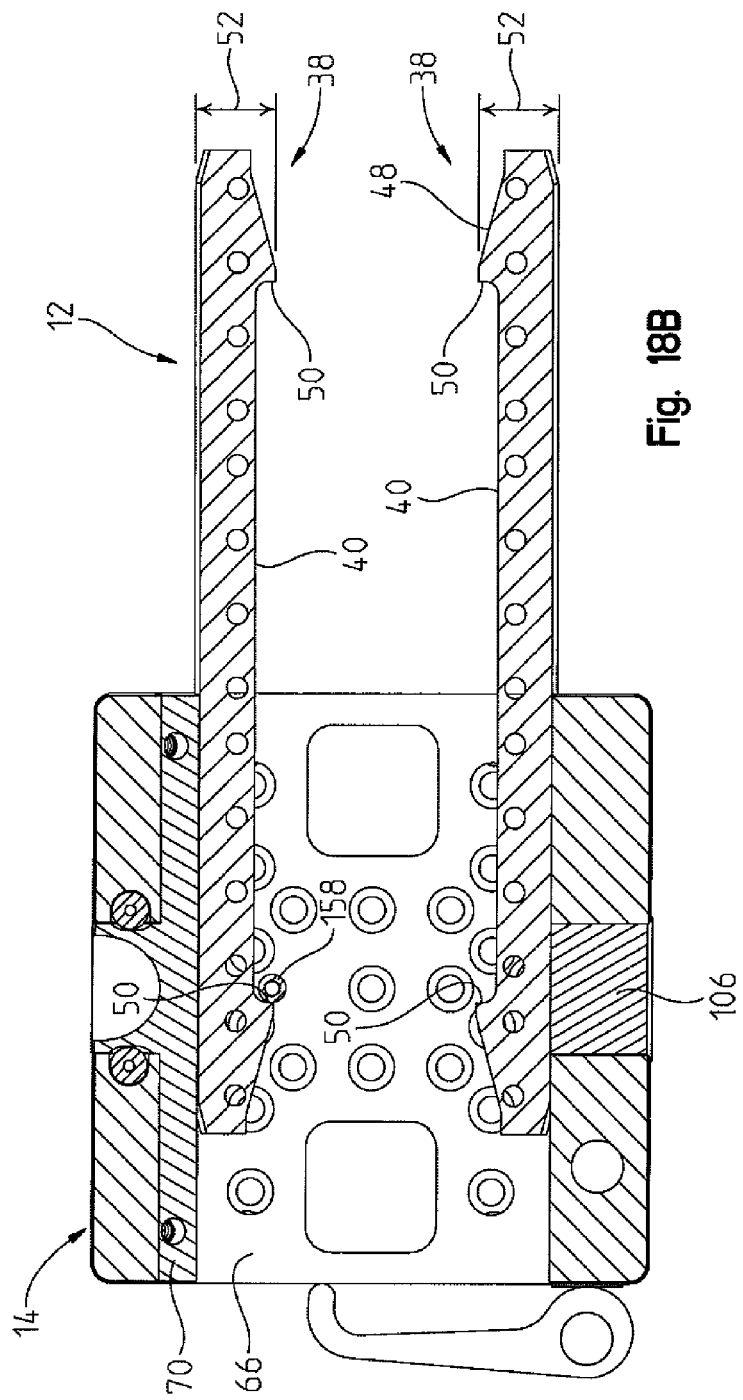

QUICK RELEASE PLATE

CROSS REFERENCE TO RELATED APPLICATION

This application is a Continuation-in-Part of U.S. patent application Ser. No. 13/316,059, filed Dec. 9, 2011, the disclosure of which is hereby incorporated by reference.

BACKGROUND OF THE INVENTION

Photographic and video cameras, and related accessories, are often mounted to objects or stands, such as tripods, cranes and other camera-carrying objects. Many quick-release mounts are available for readily attaching and detaching a camera from a stand and typically include a plate/base pair where the plate is attachable to a camera body and the base is attachable to a stand thus the plate and base feature connective members which readily attach and detach from one another.

Most quick-release mounting plates include a dovetailed tail which slides into a dovetailed socket on the base. Generally, the plate is inserted onto the base by sliding the dovetailed tail of the plate into one side of the dovetailed socket on the base, then sliding the plate along the socket to a desired position where it is then clamped in place with a clamping apparatus. Inserting the plate on the base in this manner can be referred to as "lateral insertion." The clamping apparatus serves to restrict the plate from sliding relative to the base when in the locked position.

Modern cameras may include many accessories which extend in various directions from the camera body, such as over-sized lenses, flash bulbs, and the like. In some cases, such accessories hang below the quick-release plate, which can make lateral insertion cumbersome since such accessories may have to be removed before the plate can be seated on the base. Further, such accessories can be damaged if a user inadvertently tries to install or remove the quick-release plate from the base with an accessory overhanging the plate.

An improved quick-release camera mount is needed which overcomes these and other failings of the prior art.

SUMMARY OF THE INVENTION

The present disclosure describes a quick-release camera mount which includes a plate which mounts on a base. The plate includes a dovetailed tail which mates with a dovetailed socket formed in the base, resembling a sliding dovetail joint. One side of the socket is formed from a dropping gate such that the plate can be inserted onto the base in a direction perpendicular to a plane defined by the socket. Inserting the plate on the base in this manner can be referred to as "vertical insertion." As the plate is inserted onto the base, the dropping gate recedes into a compartment which effectively widens the point of entry of the socket, allowing the dovetailed tail to be inserted into the socket. Once the plate is fully inserted, the dropping gate springs up from the compartment and overlies the dovetailed tail, thereby restricting removal of the plate from the base. With the plate seated on the base the plate is slideable along a path parallel with a plane defined by the socket. The base includes a clamping apparatus used to restrict movement of the plate on the base. A stop extends from the base which prevents the plate from sliding off of the base. A tab is formed as part of the dropping gate; when depressed, the tab causes the dropping gate to recede into the compartment, thereby allowing removal of the plate from the base.

BRIEF DESCRIPTION OF THE DRAWINGS

A preferred embodiment of this invention has been chosen wherein:

FIG. 18A is a cross-sectional side view of the plate seated on the base with the catch abutting the stop;
FIG. 18B is a cross-sectional top view of the plate seated on the base with the catch abutting the stop.

DESCRIPTION OF THE PREFERRED EMBODIMENT

Figure 1:
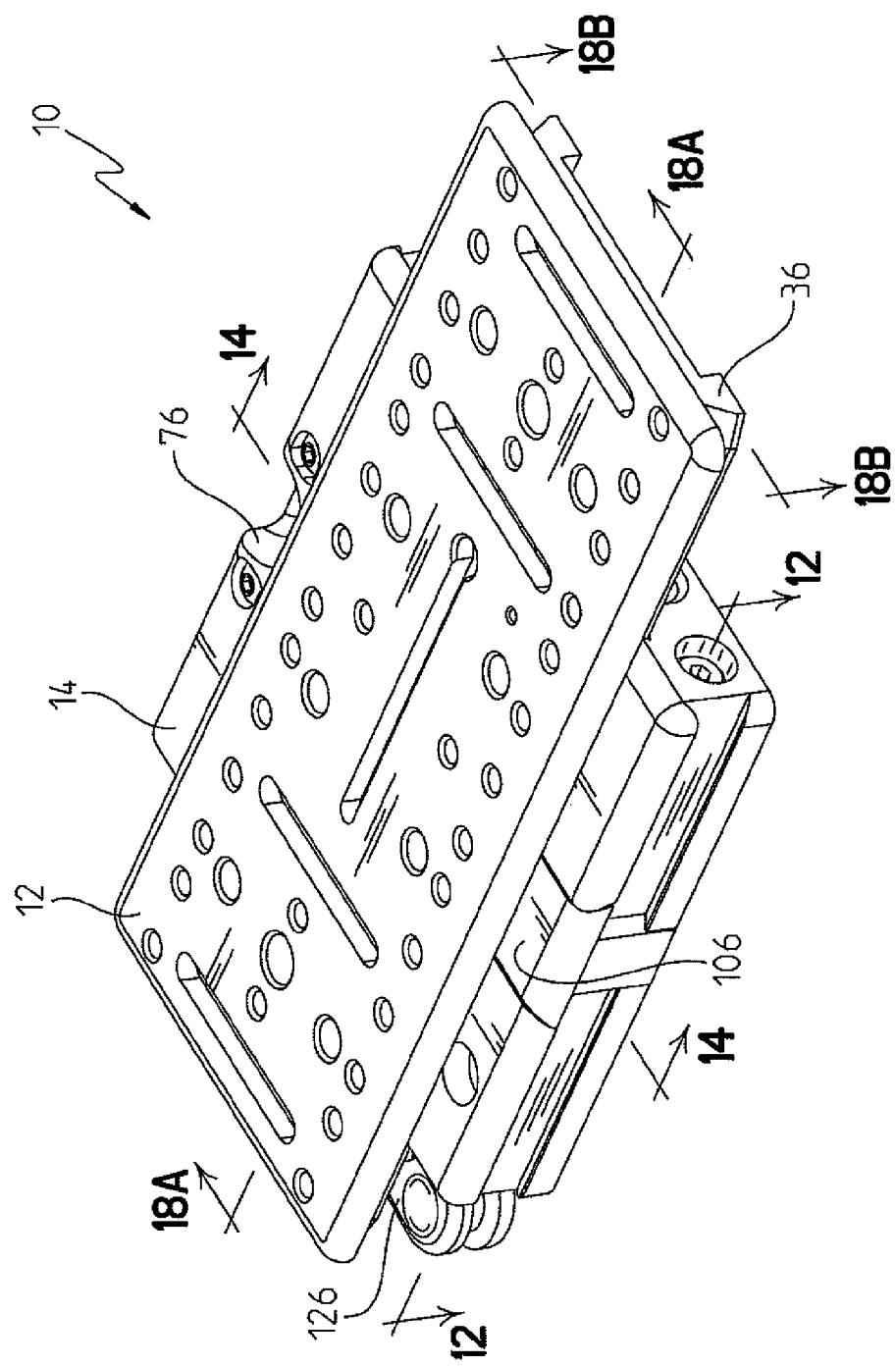
FIG. 1 is a perspective view of the plate seated on the base.

Mounting system 10 includes two main elements: a plate 12 and a base 14. Plate 12 includes a tail 36 and base 14 includes a socket 18, FIG. 4; tail 36 and socket 18 mate together in a dovetailed-fashion to removably secure plate 12 on base 14 as shown in FIG. 1. These and other aspects of mounting system 10 are described in detail as follows.

Mounting system 10 is described herein as used to mount a camera to a stand, but it is contemplated that the mounting system of the present disclosure has other applications. One example of a suitable alternative application is to use mounting system 10 to removably mount seats to a boat. As such, any reference herein to cameras should not be read as limiting the scope of the present disclosure.

Figure 2:
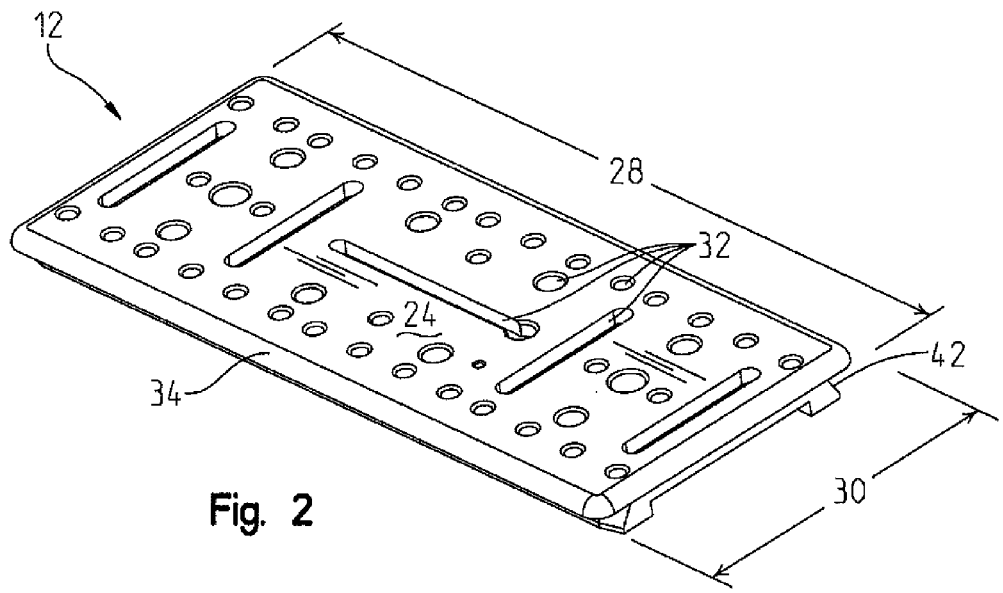
FIG. 2 is a perspective view of the top side of the plate.
Figure 3:
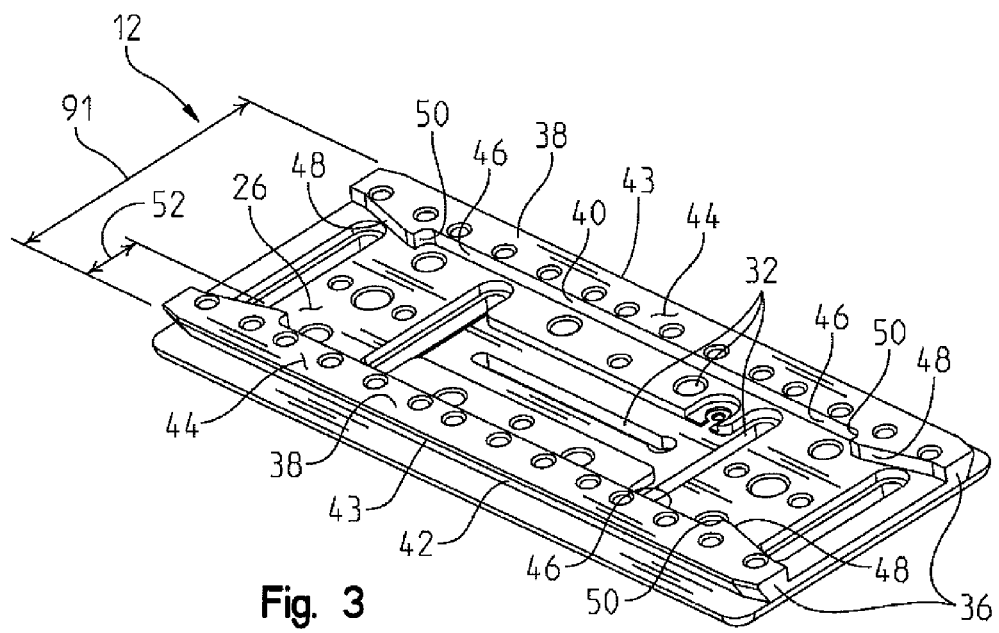
FIG. 3 is a perspective view of the bottom side of the plate.

Plate 12 is a generally rectangular plate having a top side 24, a bottom side 26, a length 28 and a width 30 as shown in FIGS. 2 and 3. Top side 24 of plate 12 is a generally flat surface which includes one or more plate apertures 32 piercing plate 12 and extending from top side 24 to bottom side 26. Apertures 32 are for attaching a device, such as a camera, to plate 12 and may be configured in a manner suitable for such attachment. In one embodiment, the perimeter of plate 12 includes a beveled edge 34. Bottom side 26 of plate 12 includes a tail 36 extending therefrom. Tail 36 is formed as a pair of opposing legs 38 which extend much of length 28 of plate 12. Each leg 38 extends proximate the perimeter edge of plate 12. Legs 38 are generally parallel with each other and parallel with length 28 of plate 12.

Each leg 38 includes an inner surface 40, a dovetailed surface 42, and a base 44 as shown in FIG. 3. The inner surface 40 of each leg 38 faces the inner surface of the opposing leg; likewise, dovetailed surface 42 of each leg 38 faces away from inner surface 40. Dovetailed surfaces 42 of each leg 38 together define tail 36 and are shaped to form a dovetailed-connection with socket 18, FIG. 4. Inner surface 40 extends between a first flared section 48 and a second flared section 48 with a pathway 46 formed therebetween. Leg 38 has a thickness 52 defined as the distance between inner surface 40 and dovetailed surface 42. Pathway 46 is a generally linear portion of leg 38 having a generally constant thickness 52. Catch 50 is defined as a stepped-increase of thickness 52 between pathway 46 and flared section 48. Flared section 48 has a greater thickness 52 than pathway 46. In one embodiment, flared section 48 includes a tapered decrease in thickness 52 as spaced away from catch 50. Base 44 of leg 38 is a generally planar surface which forms a flat base surface for plate 12. Dovetailed surface 42 meets base 44 at edge 43. Edges 43 of the respective legs 38 are spaced apart by a distance 91.

Figure 4:
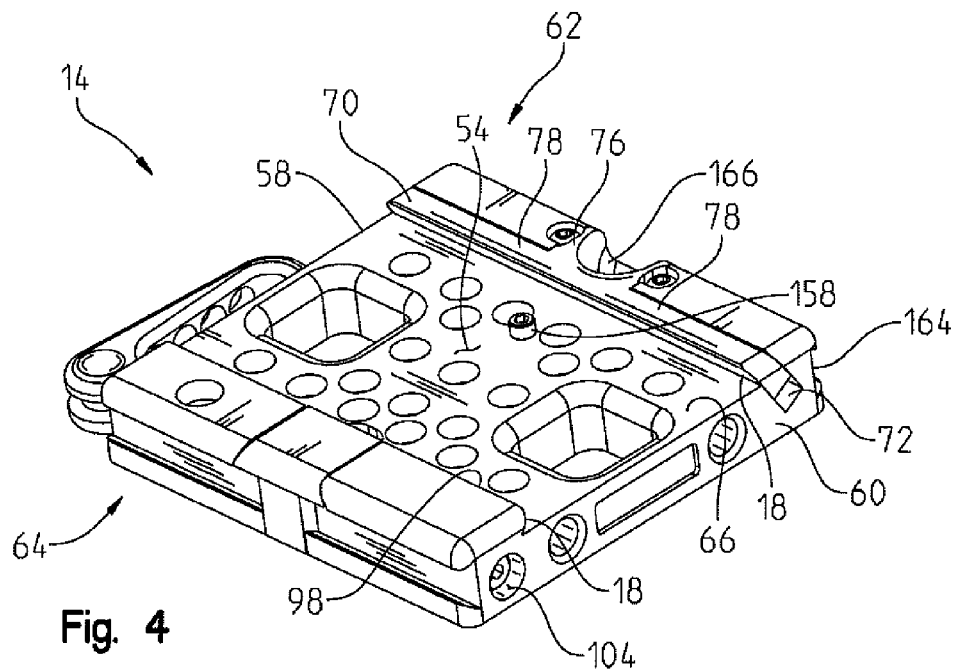
FIG. 4 is a perspective view of the top side of the base.
Figure 5:
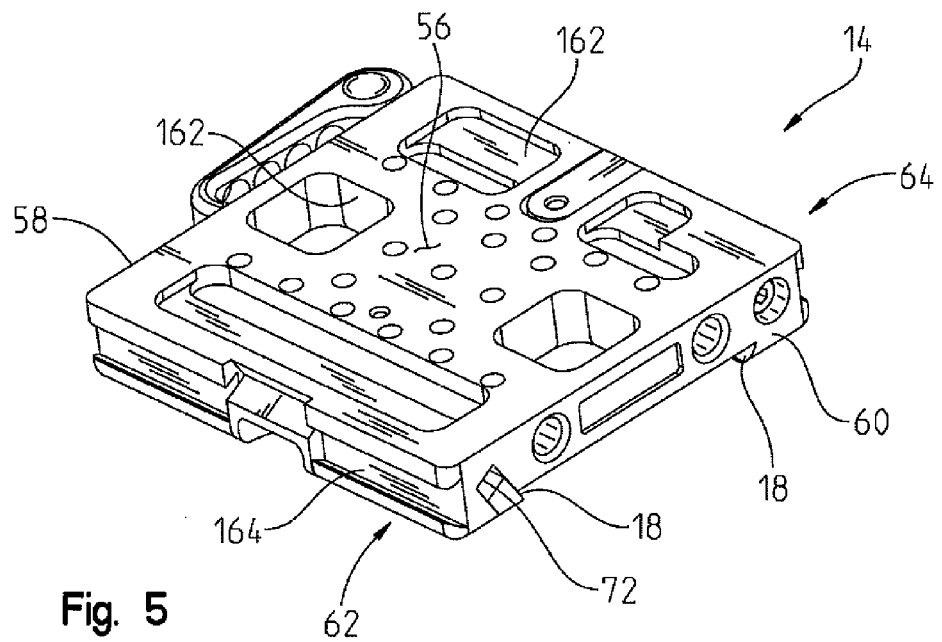
FIG. 5 is a perspective view of the bottom side of the base.
Figure 7:
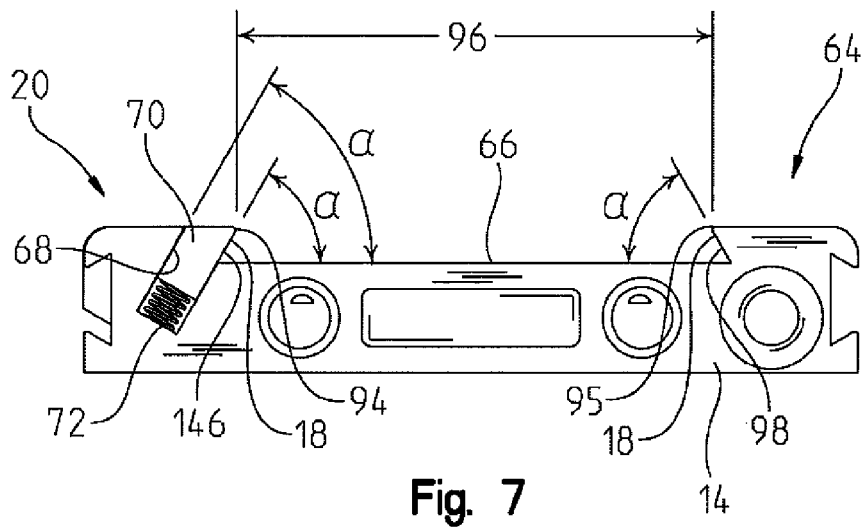
FIG. 7 is an end view of the base.

Referring now to FIGS. 4 and 5, base 14 is shaped generally as a rectangular block having a top side 54 and a bottom side 56 which are spaced apart by a perimeter edge surface defined by a first end 58, a second end 60, a gate side 62 and a clamp side 64. Top side 54 defines dovetailed socket 18 with one side of the socket formed by a dropping gate 70 and the other side of the socket formed by a clamp wall 98. A floor 66 spans top side 54 of base 14 between dropping gate 70 and clamp wall 98 and is defined as a planar surface upon which plate 12 is slidable when tail 36 is mated in socket 18. An opening 93, 96, shown on FIG. 16 is defined as the width of the opening of socket 18 (see FIGS. 7, 14 and 15). Opening 96 is the distance separating an inner edge 94 of dropping gate 70 and an inner edge 95 of clamp wall 98 as illustrated in FIG. 7. Opening 93 is the distance separating an inner edge 97 of gate side wall 68 and an inner edge 95 of clamp wall 98 as illustrated in FIGS. 7 and 16 together.

Figure 6:
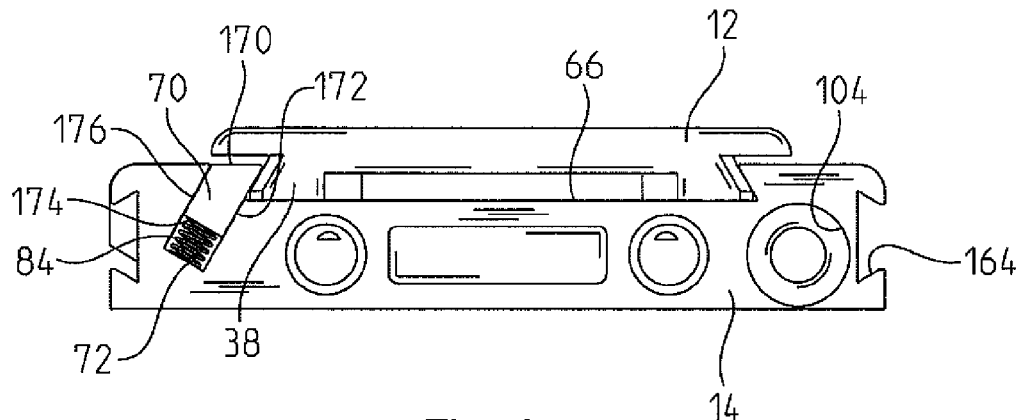
FIG. 6 is an end view of the plate seated on the base.
Figure 9:
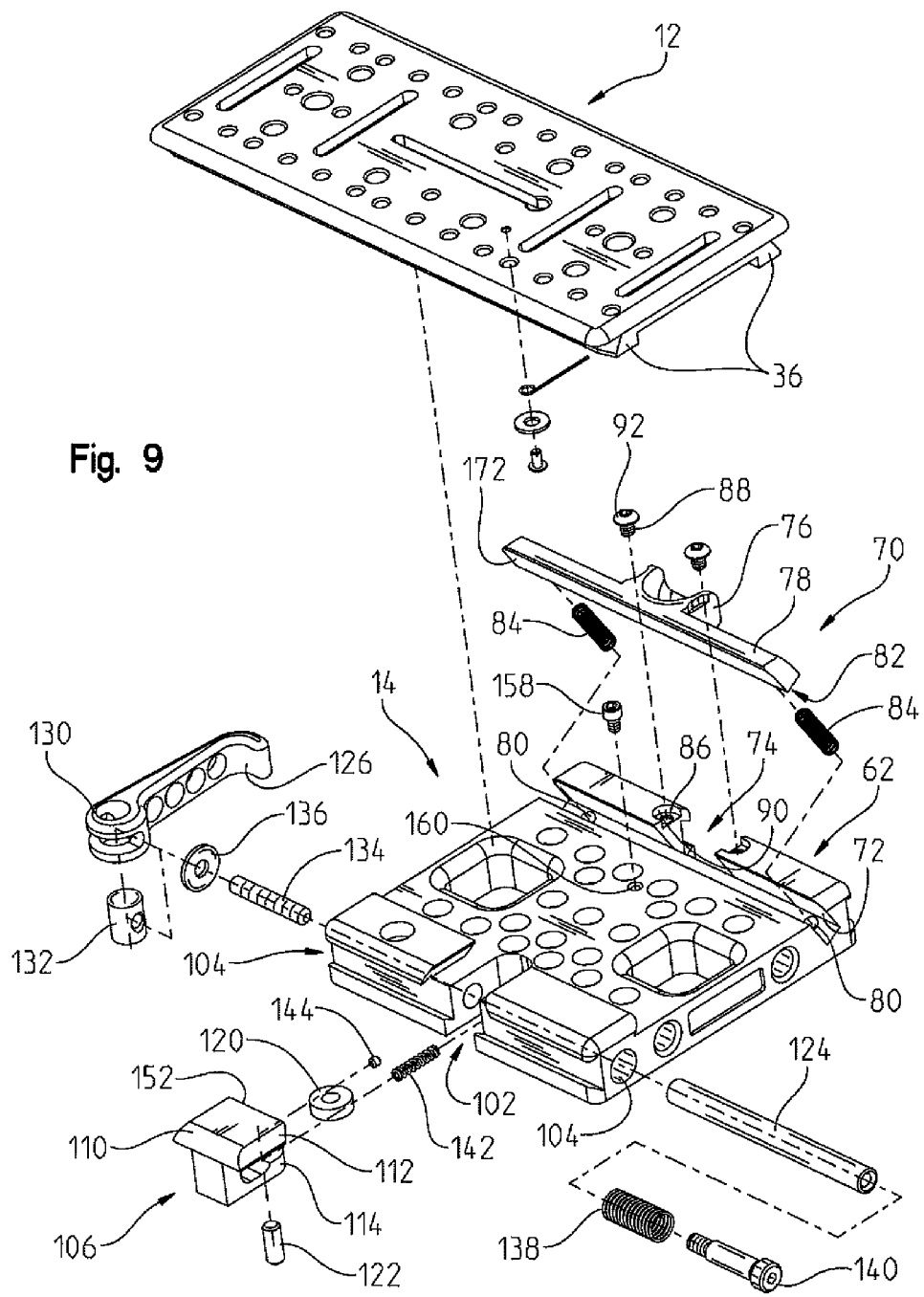
FIG. 9 is an exploded view showing the component parts of the base and the plate.

A compartment 72 is formed in base 14 beneath dropping gate 70. Compartment 72 is shaped to allow dropping gate 70 to recede into the compartment. Dropping gate 70 is generally T-shaped having a body 76 and arms 78 extending perpendicularly from the body, as shown in FIG. 9 and described in further detail below. In the preferred embodiment, arm 78 of dropping gate 70 has a cross-section shaped as a right trapezoid having a first side 170 which is generally parallel with floor 66, a second side 172 and a fourth side 176 which are parallel with one another, and a third side 174 which is perpendicular to both the second side and the fourth side, as shown in FIG. 6. Third side 174 faces compartment 72. When dropping gate 70 is in extended position (defined below), a portion of second side 172 overlies tail 36. Inner edge 94 is defined as the edge formed between first side 170 and second side 172 (as shown in FIGS. 6 and 7). Arm 78 of dropping gate 70 and compartment 72 are sized to nest together and to minimize slop therebetween. Second side 172 and fourth side 176 are parallel with one another and parallel with the path along which dropping gate 70 travels relative to compartment 72. As the dropping gate recedes, arm 78 of dropping gate 70 fills compartment 72 with first side 170 substantially flush with floor 66, thereby the size of opening 96 increases to allow room for tail 36 to be vertically-inserted in socket 18.

Vertical insertion of plate 12 on base 14 is defined as insertion along a path perpendicular to a plane passing through both legs 38 of plate 12. Reference to vertical herein does not necessarily refer to a direction perpendicular to the ground where the mounting system is used, as base could be mounted in any spatial orientation and plate 12 can then be mounted vertically thereto, as opposed to laterally which is defined as a path parallel to a plane passing through legs 38.

Gate side wall 68 is spaced from floor 66 by compartment 72; compartment 72 is a trough formed between floor 66 and gate side wall 68, as shown in FIG. 7. Compartment 72 extends the length of floor 66 and is parallel to, and spaced inwardly from, gate side wall 68.

Figure 17:
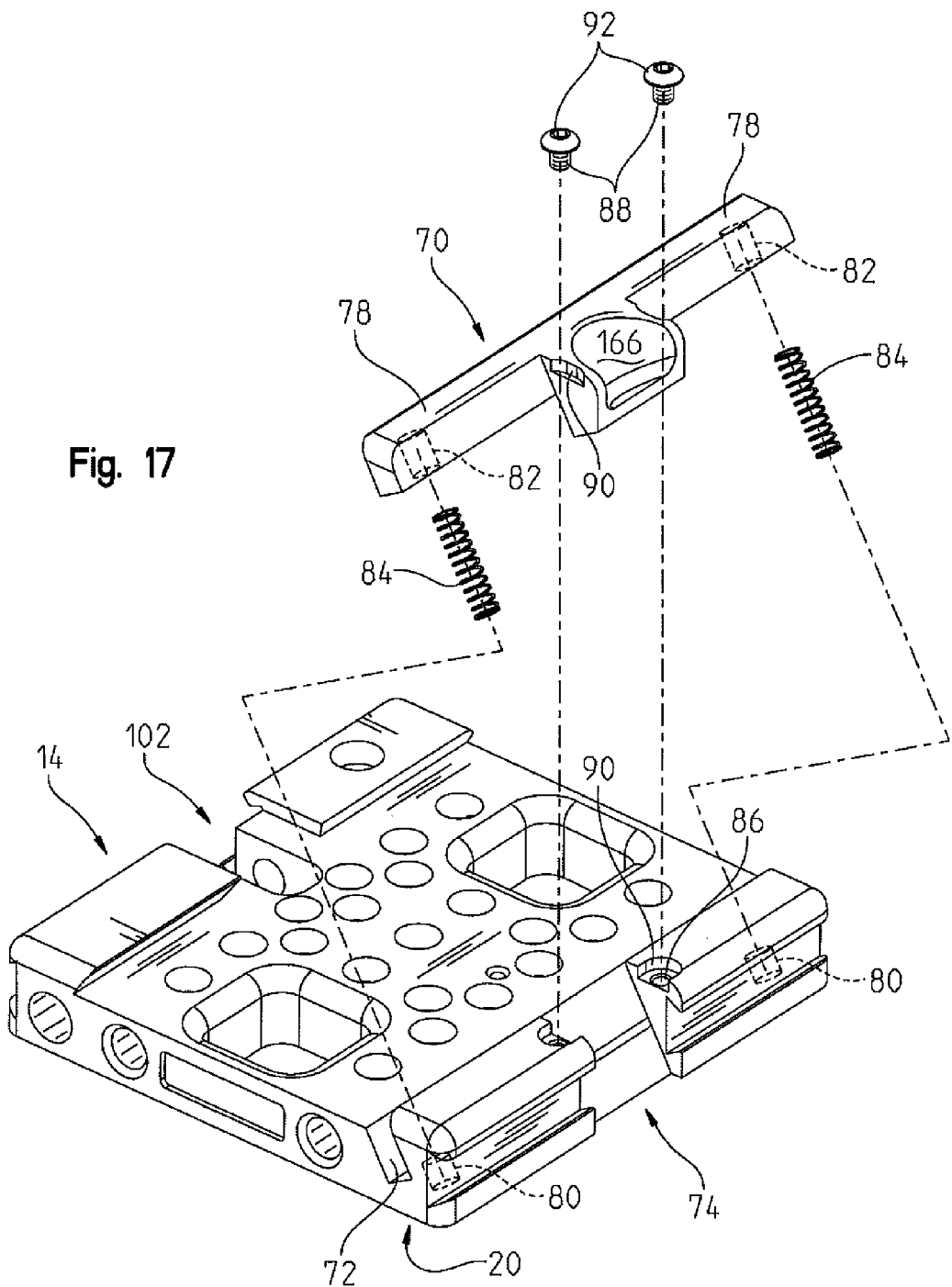
FIG. 17 is an exploded view of the base and the components of the dropping gate.

A cut-out 74 is formed as a gap in gate side 62 as shown in FIG. 9. Referring to FIGS. 9 and 17, dropping gate 70 is formed having a body 76 shaped to nest within cut-out 74. An arm 78 extends from body 76. Arm 78 extends parallel to gate side 62 and is sized to nest within compartment 72. Arm 78 includes second side 172 which forms one half of socket 18. Arm 78 and compartment 72 include spring bores 80, 82 positioned along a common axis and together house a spring 84. Spring 84 urges dropping gate 70 out of compartment 72. Dropping gate 70 biases between an extended position and a recessed position. When in extended position second side 174 partially extends over a portion of floor 66. When in recessed position, arm 78 is housed within compartment 72 with first side 170 substantially flush with floor 66. In one embodiment, body 76 includes a depression 166, FIG. 4 which serves as a tactile reference to indicate where to push on body 76 to move dropping gate 70 to recessed position to either insert or remove plate 12 from base 14.

Figure 8:
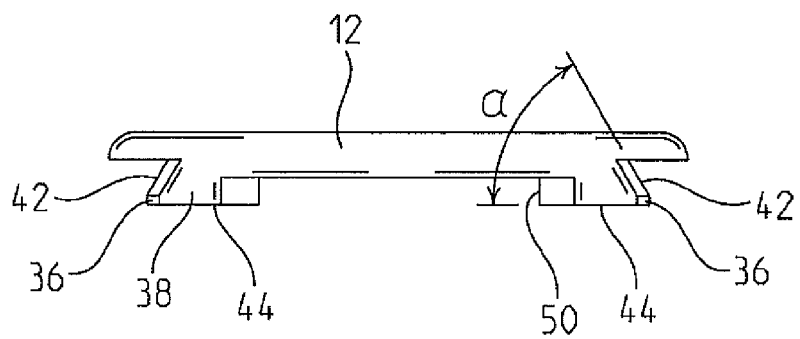
FIG. 8 is an end view of the plate.

Referring to FIGS. 6, 7 and 8 tail 36 and socket 18 are defined by an angle α which is formed between floor 66 and each of dovetailed surface 42 of tail 36. Both tail 36 and socket 18 are defined by angle α, so that they mate together in a dovetailed-relationship. Dropping gate 70 drops into compartment 72 along a path defined by angle α and a plane parallel to second side 172, with compartment 72 cut in base 14 along such plane, such that as the dropping gate recedes into the compartment the inner edge 94 of dropping gate 70 moves away from clamp wall 98—thereby the size of opening 96 between the dropping gate and the clamp wall 98 increases as the dropping gate recedes into the compartment toward recessed position.

A bore 86 is formed in top side 54 of gate side 62 of base 14 adjacent cut-out 74 for accepting a fastener 88 as shown in FIG. 9. In one embodiment a counter-bore 90 is formed around bore 86, with a portion of counter-bore 90 formed on body 76 of dropping gate 70. Fastener 88 includes a head 92 which partially overlaps body 76 thereby preventing spring 84 from urging dropping gate 70 beyond head 92—thereby the travel of dropping gate 70 is restricted on one end by the depth of compartment 72 (or alternatively, the maximum compression of spring 84) and on the other end by head 92.

Dropping gate 70 recedes into compartment 72 when a force great enough to compress spring 84 is exerted on body 76 and/or arm 78, all shown on FIG. 9, shown compressed in FIG. 16. Plate 12 is inserted on base 14 by lowering plate 12 toward base 14 until tail 36 contacts dropping gate 70. Tail 36 is then pressed against dropping gate 70 which causes the gate to lower into compartment 72. With dropping gate 70 retracted into compartment 72 opening 93 is sized to accept tail 36 into socket 18 whereby base 44 of tail 36 rests flush with floor 66 and the dropping gate is then free to spring back against fastener 88, FIG. 9 (see FIGS. 14 and 15). Thereby plate 12 is held against base 14 by dropping gate 70 overlying tail 36.

Figure 14:
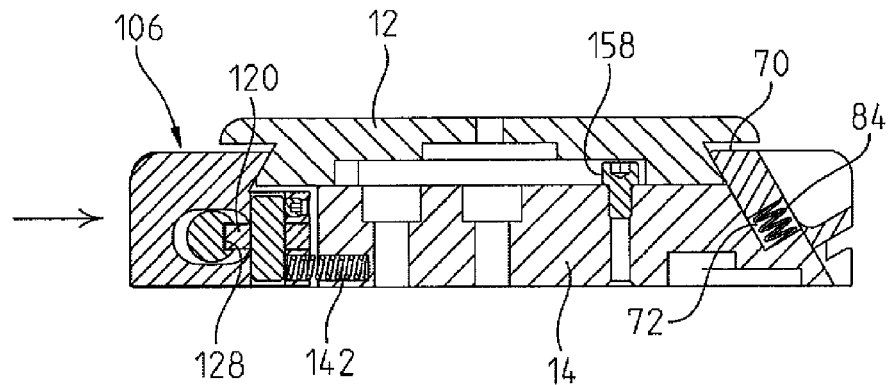
FIG. 14 is a cross-sectional end view of the plate and base showing the clamp assembly in the locked position and the dropping gate in the extended position.
Figure 15:
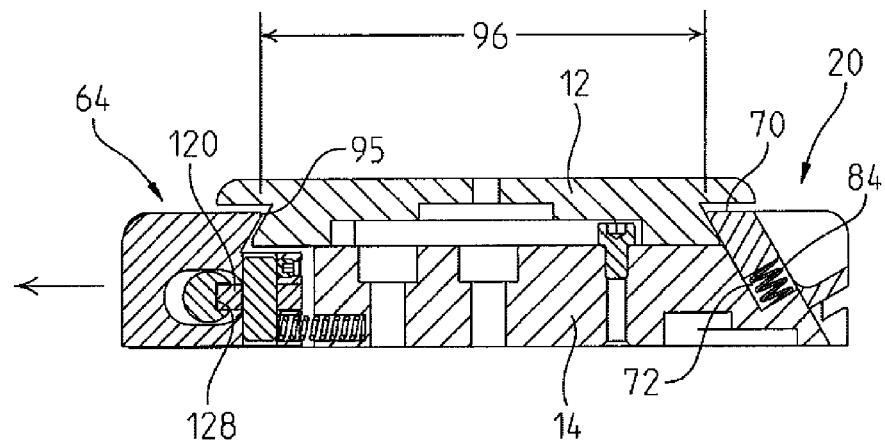
FIG. 15 is a cross-sectional end view of the plate and base showing the clamp assembly in the unlocked position and the dropping gate in the extended position.
Figure 16:
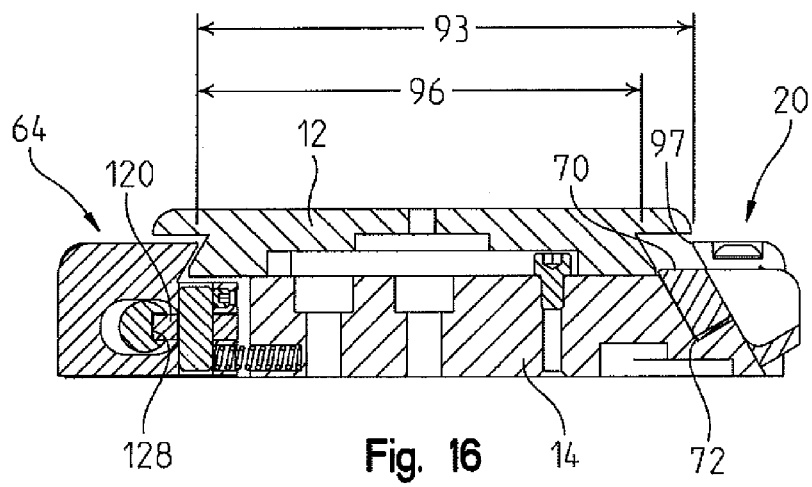
FIG. 16 is a cross-sectional end view of the plate and base showing the clamp assembly in the unlocked position and the dropping gate in the recessed position.

With plate 12 installed on base 14, dropping gate 70 overlies tail 36, as shown in FIGS. 14 and 15. Dropping gate 70 forms half of socket 18 (the other half of socket 18 being formed by clamp wall 98), such that tail 36 and socket 18 form a restrictive fit that limits movement of plate 12 relative to base 14 to linear movement along a line parallel with legs 38 of plate 12. Such movement can be restricted by use of a clamp assembly 100, as described in greater detail below, which holds plate 12 in a fixed position relative to base 14.

Clamp side 64 of base 14 includes clamp wall 98 and clamp assembly 100. Clamp wall 98 is an upwardly extending tapered wall extending from floor 66 which forms half of socket 18, with the other half formed by dropping gate 70. Clamp wall 98 includes a cut-out 102 separating the clamp wall into two sections (as shown in FIG. 9). A clamp bore 104 passes through base 14 adjacent to, and parallel with, clamp wall 98. Clamp bore 104 accepts a clamp assembly 100 which serves to restrictively hold plate 12 to base 14, as described in further detail below.

Figure 10:
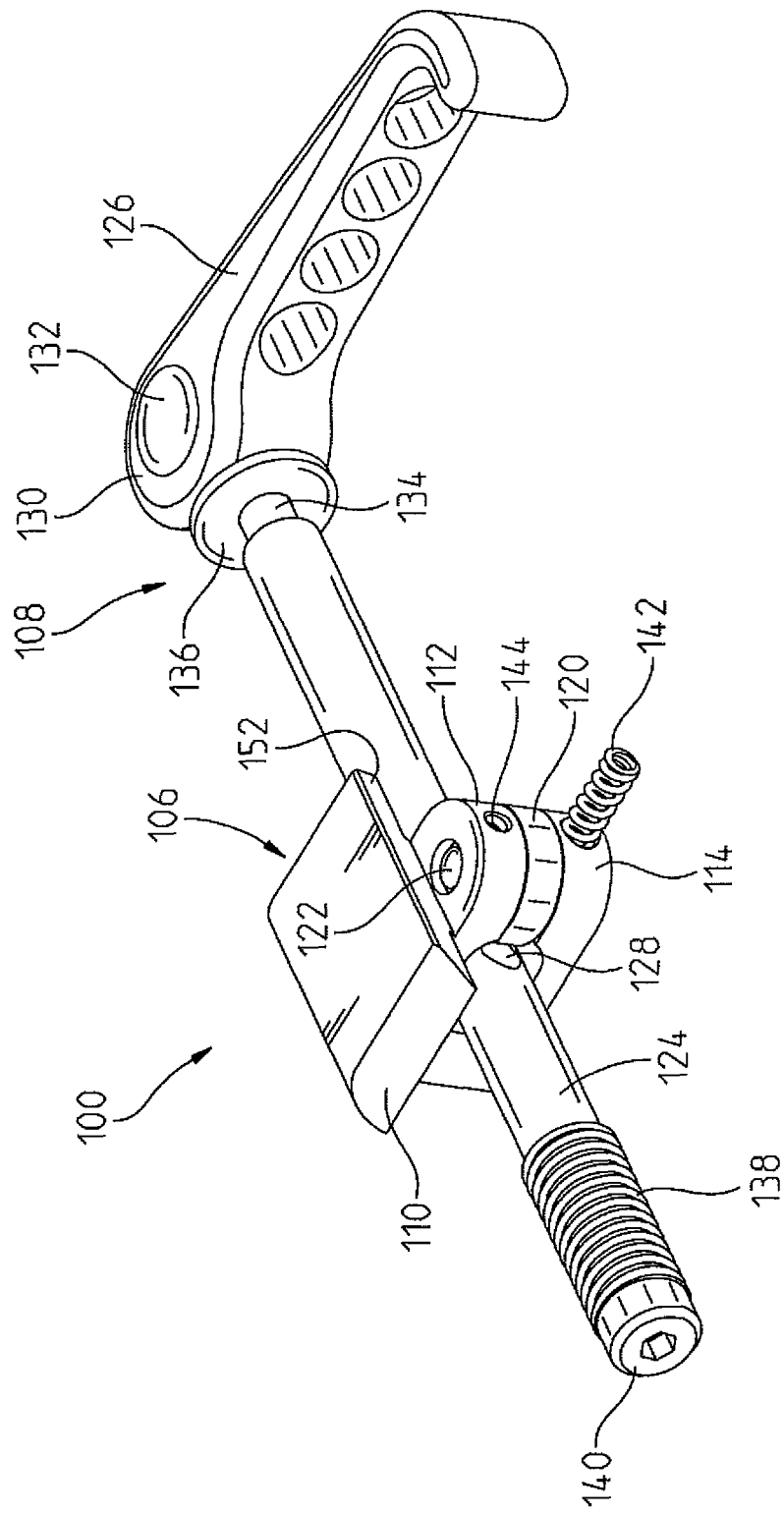
FIG. 10 is a perspective view of the clamp assembly as removed from the base.
Figure 11:
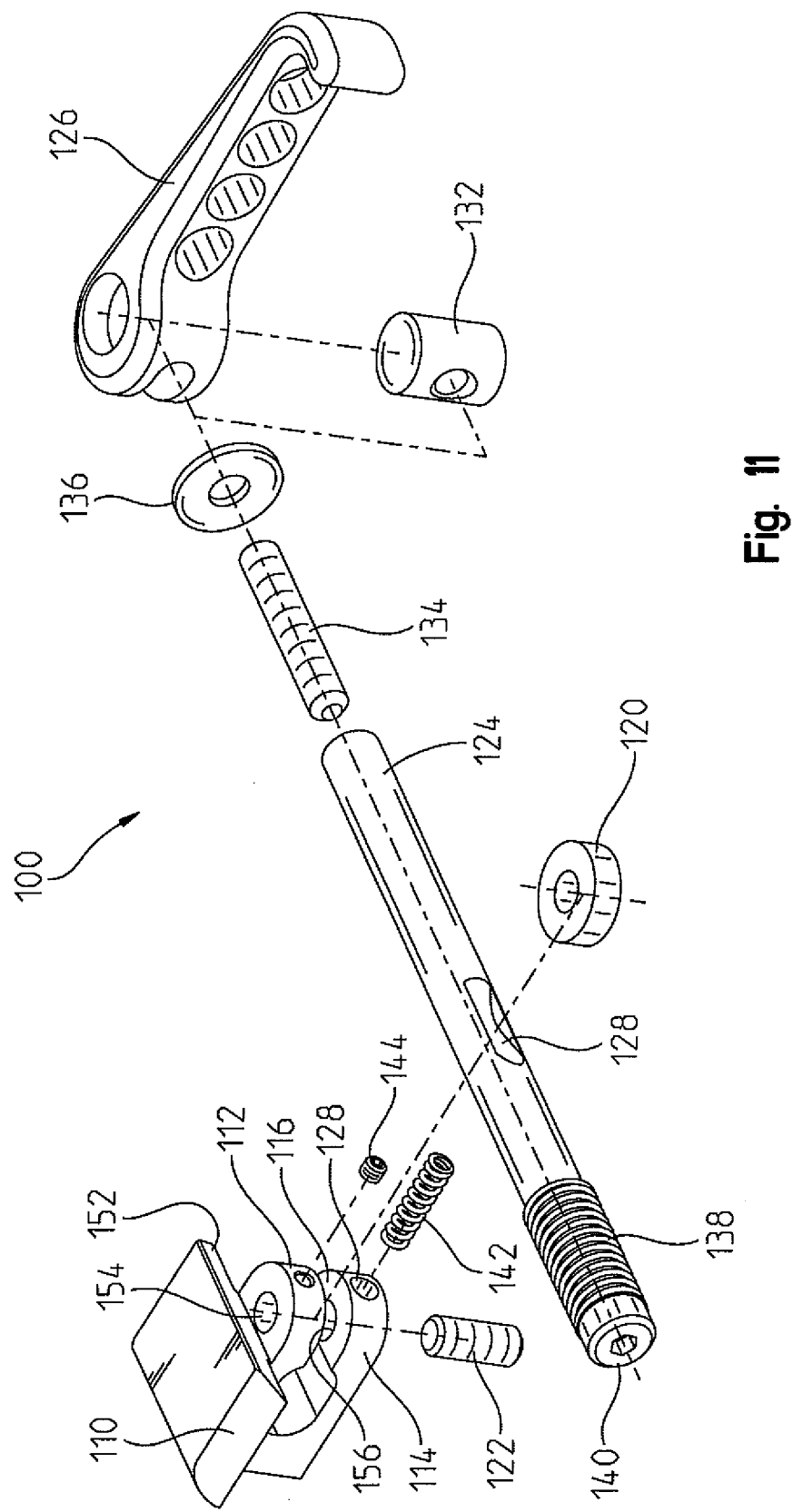
FIG. 11 is an exploded view of the clamp assembly of FIG. 10.
Figure 12:
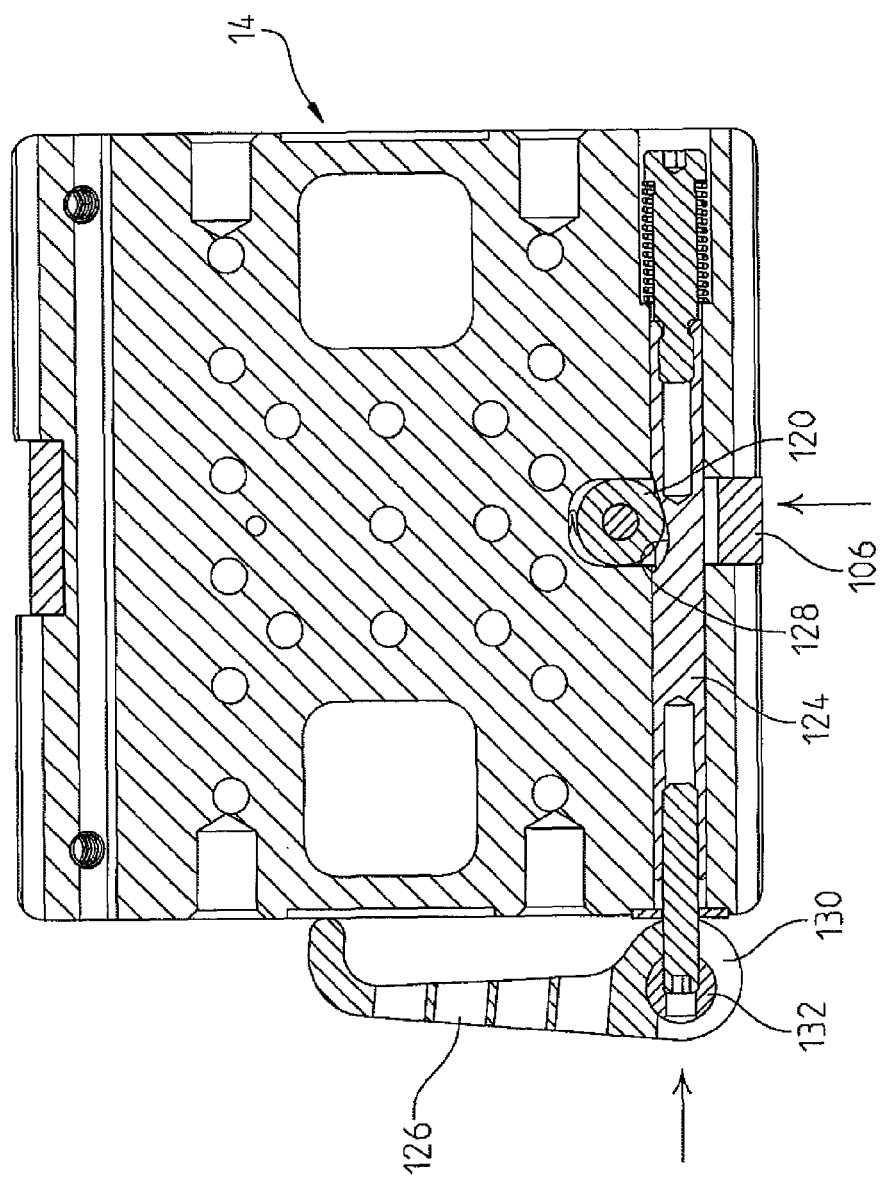
FIG. 12 is a cross-sectional top view of the base showing the clamp assembly in the locked position.
Figure 13:
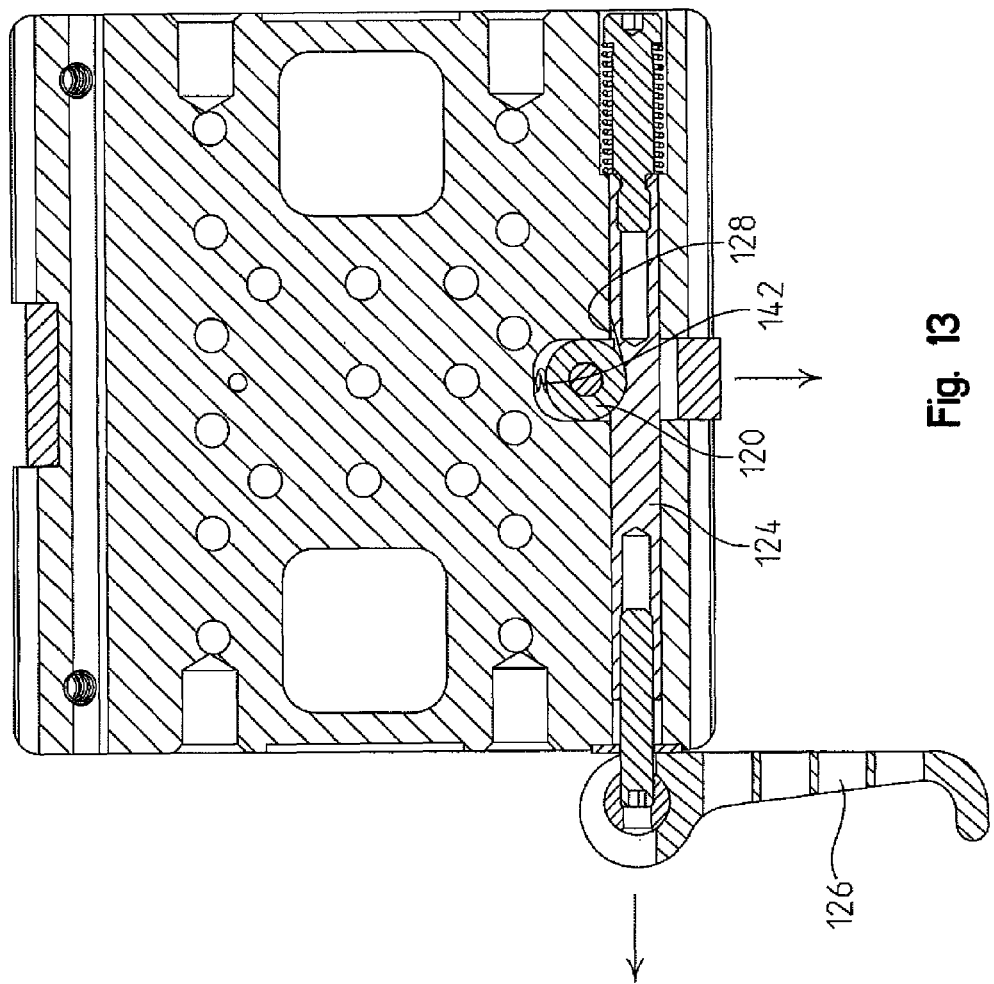
FIG. 13 is a cross-sectional top view of the base showing the clamp assembly in the unlocked position.

Referring now to FIGS. 10 and 11, clamp assembly 100 includes a clamp body 106 and a cam assembly 108 which together form a clamp which may be tightened to restrict movement of plate 12 relative to body 14. Clamp body 106 includes a tapered crown 110 sized to fit in cut-out 102, FIG. 9. Clamp body 106 includes a C-shaped extension extending from the crown which is composed of an upper support 112 and a lower support 114 with a gap 116 formed therebetween. A pair of aligned bores 154, 156 pass through supports 112, 114 and are sized to accept a pin 122. Gap 116 is sized to accept a ring 120 which is held in gap 116 of clamp body 106 by pin 122 which is secured in bores 154, 156. Additionally, a set screw 144 forms a friction fit between pin 122 and upper support 112 to retain the pin in clamp body 106. In one embodiment, clamp body 106 and cut-out 102 mate together in a dovetailed-relationship so as to limit the movement of the clamp body relative to base 14 to lateral motion along an axis passing through cut-out 102 and cut-out 74 of gate side 62. Clamp body 106 includes a dovetailed face 152 which forms a portion of socket 18 and is biased against plate 12 by clamp assembly 100.

Clamp assembly 100 includes a shaft 124 carried in clamp bore 104, FIG. 9. Clamp assembly 100 has an indentation, or wedge 128, formed as a sloped, recessed surface in an intermediate portion of shaft 124. Ring 120 is seated against wedge 128. Wedge 128 has a sloped surface, such that as shaft 124 moves axially, ring 120 is urged radially relative to the shaft thereby moving clamp body 106 along a linear path perpendicular to the length of shaft 124. In this way, axial movement of shaft 124 is transformed through wedge 128 to perpendicular motion of clamp body 106. Shaft 124 is joined to a clamp arm 126 such that as the clamp arm is articulated about a pin 132 the shaft moves axially. Clamp arm 126 is preferably proximate to first end 58 of base 14, though this orientation may vary within the scope of this disclosure. Clamp arm 126 includes a cammed-wall 130 having a varying-diameter such that as the clamp arm is articulated about pin 132, shaft 124 is drawn toward or away from the clamp arm. Pin 132 is connected to shaft 124, such as by a connecting rod 134, with a washer 136 spaced between clamp arm 126 and base 14 along a lateral path. Articulation of clamp arm 126 is translated to axial movement of shaft 124 due to the eccentric nature of cammed-wall 130. In one embodiment shaft 124 includes a spring 138 which urges shaft 124 against clamp arm 126 to aid moving the shaft in the direction of the clamp arm. In another embodiment, shaft 124 includes a bolt 140 for adjusting the tightness of the clamp by varying the axial position of shaft 124 in clamp bore 104. Where present, bolt 140 and spring 138 are positioned at the opposite end of shaft 124 from clamp arm 126. In a further embodiment a spring 142 is positioned between clamp body 106 and base 14 to urge the clamp body away from base 14.

Referring now to FIGS. 18A and 18B, a stop 158 is seated in a bore 160 formed in floor 66 of base 14. Stop 158 extends from floor 66 such that when plate 12 is seated on base 14, stop 158 is proximate inner surface 40 of one of legs 38. Stop 158 is fixed to base 14, such that it does not retract or otherwise recede into floor 66—once seated in bore 160, stop 158 is immovable within bore 160 in the normal operation of the base and plate. Legs 38 are generally symmetrical such that plate 12 may be seated on base 14 with either leg 38 proximate stop 158, allowing for flexibility in mounting a camera to the plate, and the plate to the base. Plate 12 is slidable on base 14 along a linear path, when clamp assembly 100 is not in restrictive contact with the plate, wherein the plate is freely slidable when stop is proximate pathway 46, such linear movement is restricted by stop contacting catch 50. Thereby, catch 50 limits the linear travel of plate 12 relative base 14. The use of stop 158 and catch 50 represents a significant improvement over the prior art. In prior art quick-release camera mounts, once the plate is mounted in the dovetailed-base, the plate is freely slidable until a clamping mechanism is locked. In such instances, if the base is mounted vertically or on an incline, the plate would be free to slide off the base if the clamp fails or is not engaged. In the present disclosure, stop 158 and catch 50 are safety devices which prevent plate 12 sliding off of base 14. Such a fixed stop 158 would be incompatible with prior art lateral-insertion camera mounts, since the stop would prevent insertion and removal of the plate from the base. The reason for this failure is that catch 50 on plate 12 of the present disclosure inhibits both lateral insertion and removal of the plate from base 14 as both catch 50 and stop 158 are non-retractable—meaning that there is no mechanical mechanism which allows one or both of the catch or stop to move to allow lateral insertion or removal of plate 12 from base 14—such a design is a built-in safety feature to prevent plate 12 from inadvertently sliding off of base 14.

Together, vertical insertion, and the catch/stop overcome the primary failings of the prior art. First, vertical loading allows plate 12 to be inserted on base 14 even when an object mounted on plate 12 includes objects which overhang the plate and would prevent lateral insertion. Second, the catch/stop serve as a safety device to prevent plate 12 from sliding linearly off of base 14.

In one embodiment a weight reducing carve out 162, FIG. 5 is formed in base 14. Carve out 162 is included where a light-weight base is desired. In another embodiment a lateral socket 164, FIG. 5 is formed in the outer perimeter of base 14. Socket 164 is adapted for accepting a tail of an accessory for mounting to base 14.

Figure 19:
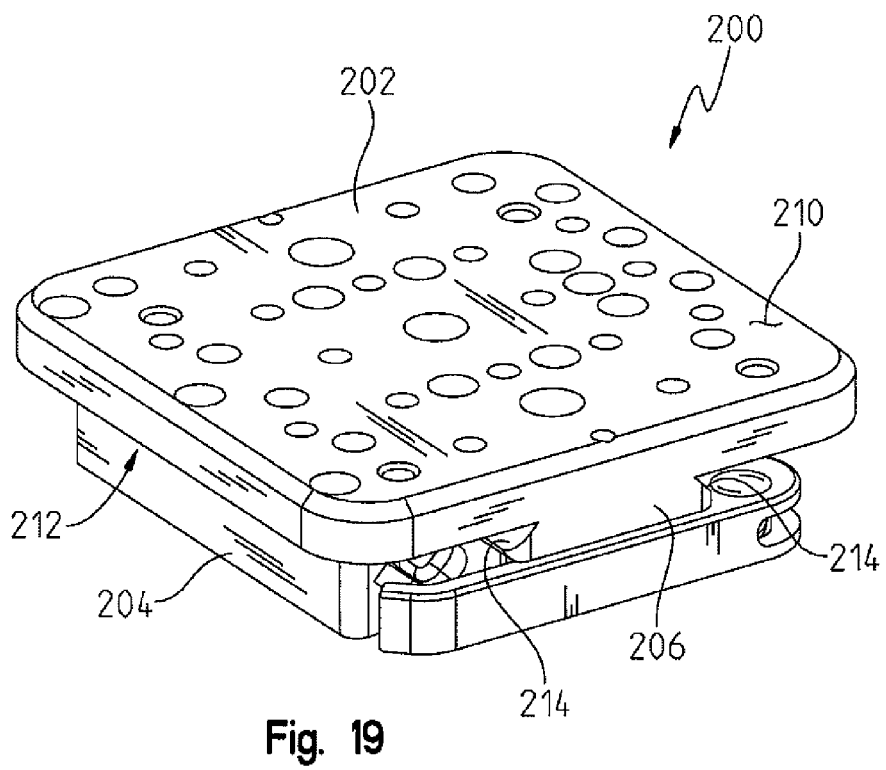
FIG. 19 is a perspective view showing an alternative embodiment of the mounting system.

In an additional embodiment, shown in FIGS. 19-30, a mounting system 200 includes two main elements: a plate 202 and a base 204. Plate 202 includes a tail 206 and base 204 includes a socket 208; tail 206 and socket 208 mate together in a dovetailed-fashion to removably secure plate 202 on base 204 as shown in FIG. 19. These and other aspects of mounting system 200 are described in detail as follows.

Plate 202, FIG. 19 is a generally rectangular plate having a top side 210, and a bottom side 212; bottom side 212 of plate 202 includes tail 206 extending therefrom. Tail 206 is formed as a unitary member and extends much of the length of plate 202. Tail 206 includes dovetailed surfaces 214 which define opposing sides of tail 206 and are shaped to form a dovetailed-connection with socket 208.

Figure 20:
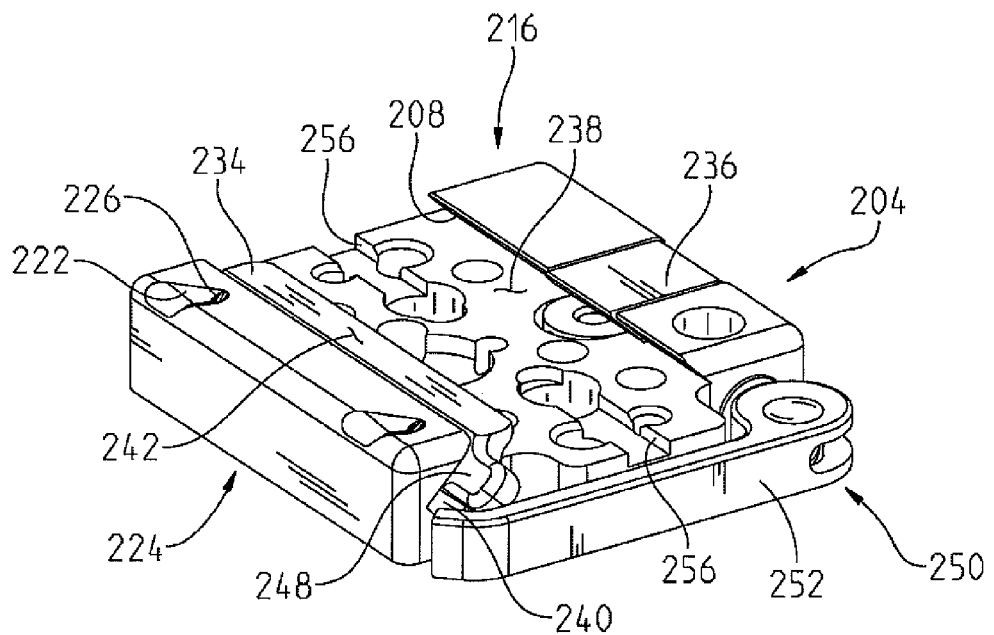
FIG. 20 is a perspective view of the mounting system of FIG. 19 with the plate removed.
Figure 21:
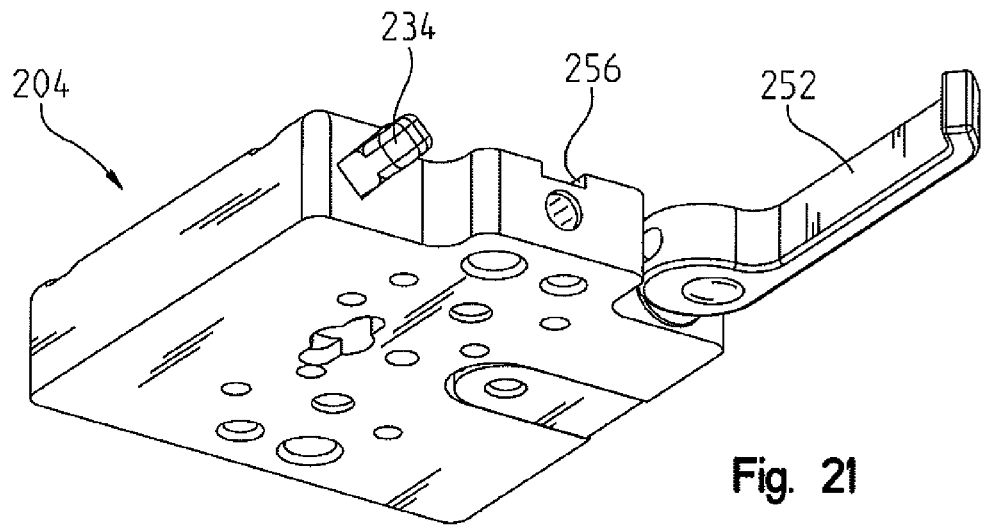
FIG. 21 is a perspective view of the base of the mounting system of FIG. 19 with the clamp arm in the unlocked position.

Referring now to FIGS. 20 and 21, base 204 is shaped generally as a rectangular block having a top side 216 and a bottom side 224 which are spaced apart by a perimeter edge surface. Top side 216 defines dovetailed socket 208 with one side of the socket formed by a dropping gate 234 and the other side of the socket formed by a clamp wall 236. A floor 238 spans top side 216 of base 204 between dropping gate 234 and clamp wall 236 and is defined as a planar surface upon which plate 202 is slidable when tail 206 is mated in socket 208.

A compartment 240 is formed in base 204 beneath dropping gate 234. Compartment 240 is shaped to allow dropping gate 234 to recede into the compartment. Dropping gate 234 is an elongate member having a cross-section generally shaped as a right trapezoid. When dropping gate 234 is in the extended position (defined below), a portion of the dropping gate overlies tail 206. When dropping gate 234 is in the recessed position (defined below), dropping gate 234 substantially fills compartment 240. Dropping gate 234 includes a first side 242, which defines the top surface of the dropping gate and is substantially flush with floor 238 when the dropping gate is in the recessed position.

Figure 26:
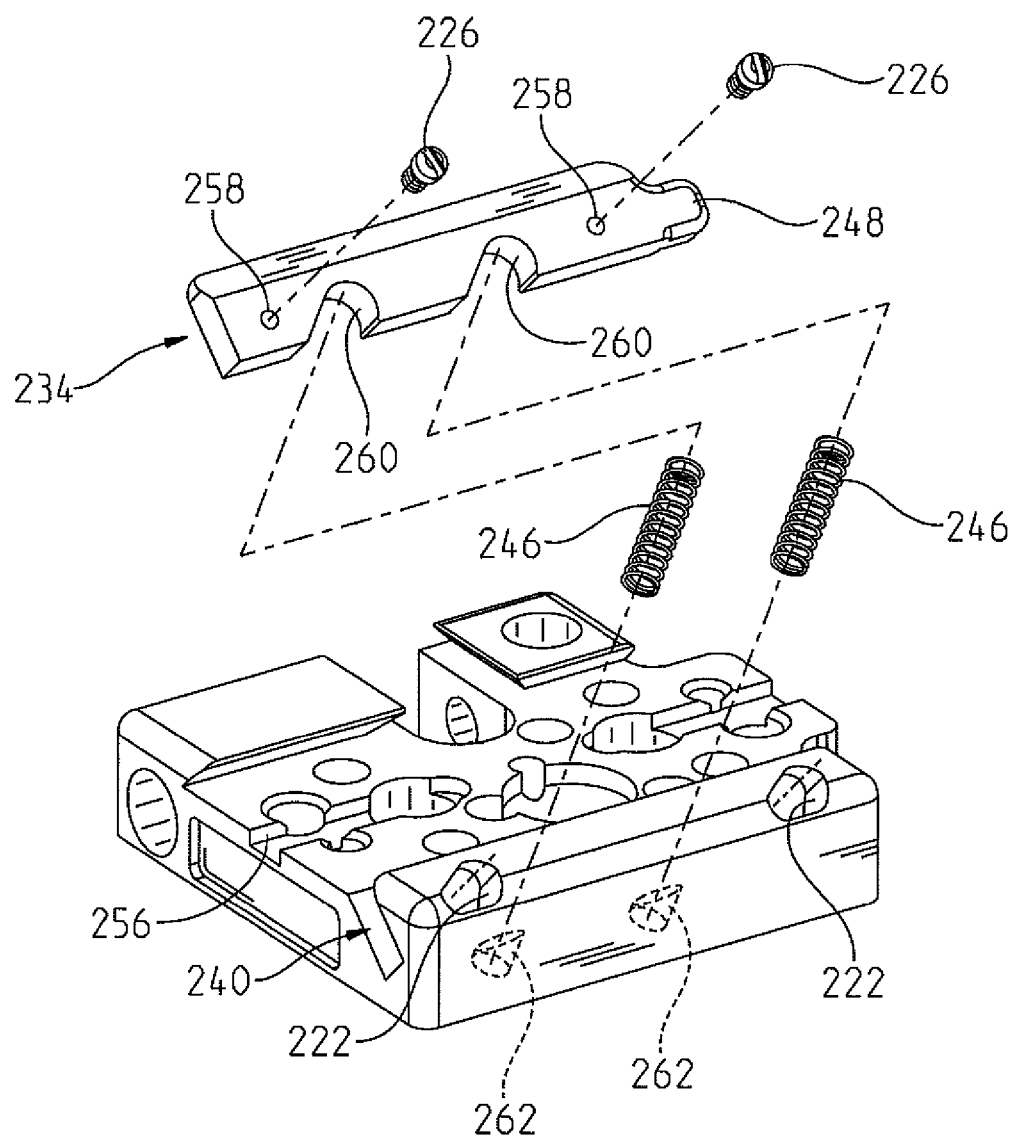
FIG. 26 is an exploded view of the base and dropping gate.
Figure 29:
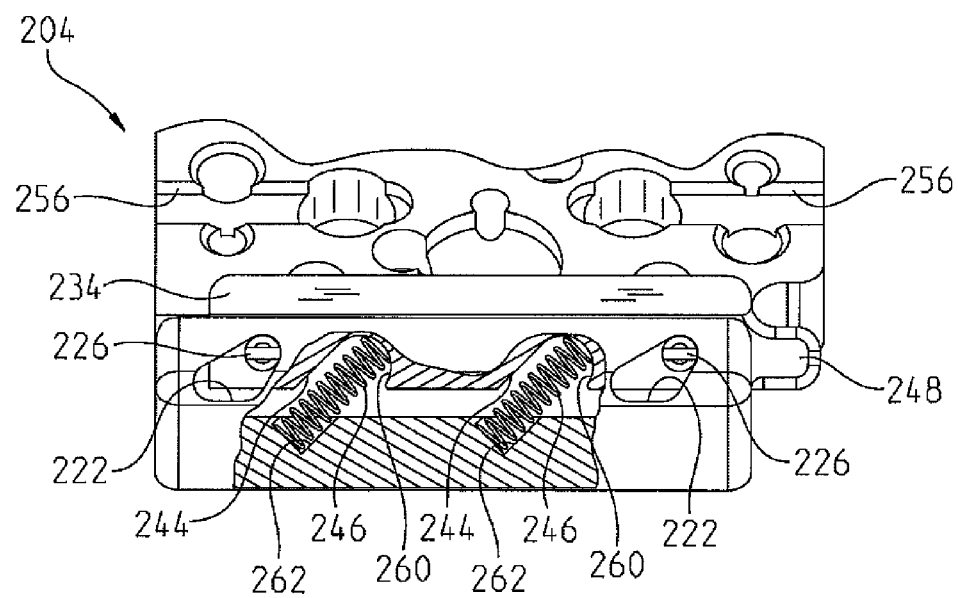
FIG. 29 is a cutaway view of the base showing the springs and dropping gate in the extended position.
Figure 30:
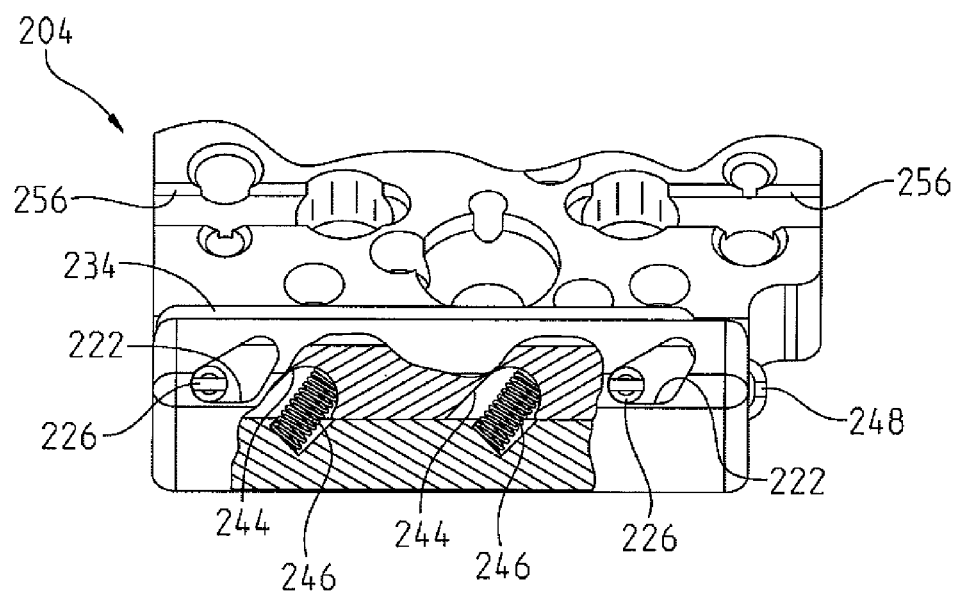
FIG. 30 is a cutaway view of the base showing the springs and dropping gate in the recessed position.

A spring bore 244, FIG. 29 is formed from a first cavity 260, FIG. 26 and a second cavity 262 which together are aligned along a common axis, with the first cavity 260 formed in dropping gate 234 and the second cavity 262 formed in compartment 240 as shown in FIGS. 26, 29, 30. Spring bore 244 houses a spring 246. Spring 246 urges dropping gate 234 out of compartment 240. Dropping gate 234 biases between an extended position and a recessed position. When in the extended position, dropping gate 234 partially extends over a portion of floor 238. When in the recessed position, dropping gate 234 is housed within compartment 240. Dropping gate 234 includes a tab 248 which serves as a tactile reference to indicate where to push to move dropping gate 234 to the recessed position to either insert or remove plate 202 from base 204.

Figure 27:
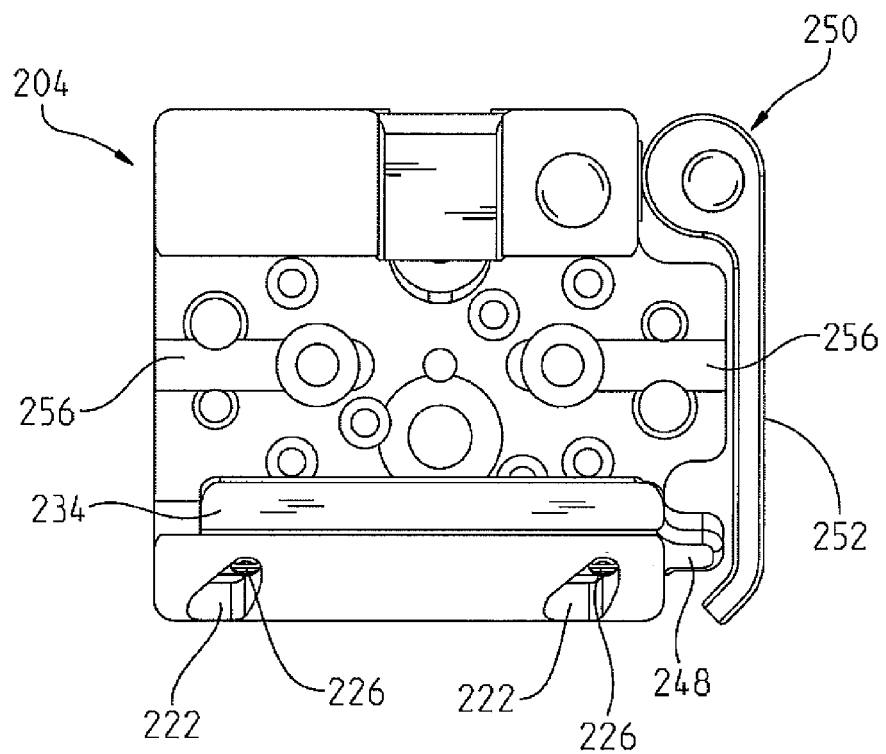
FIG. 27 is a top view of the base of the mounting system with the dropping gate in the extended position.
Figure 28:
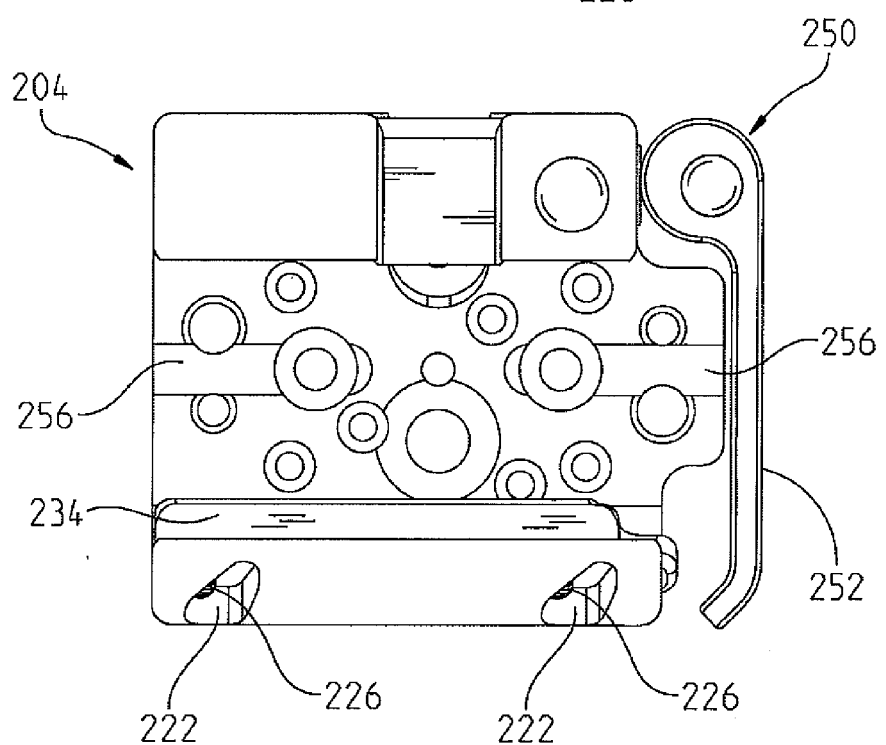
FIG. 28 is a top view of the base of the mounting system with the dropping gate in the recessed position.

As shown in FIG. 26, tab 248 extends from one end of dropping gate 234. Tab 248 extends outwardly from the perimeter face of base 204 in the direction of a clamp arm 252 (described below and as shown in FIGS. 26, 27). Tab 248 is accessible to a user regardless of the top surface dimensions of plate 202; tab 248 is accessible when plate 202 has a larger top surface than that of base 204.

A bore 222 is formed in base 204 to restrict the movement of a fastener 226 as shown in FIG. 20 and in exploded view in FIG. 26. Fastener 226 includes a head which extends into bore 222 and prevents dropping gate 234 from being advanced away from body 204 beyond the extended position; thereby, the travel of dropping gate 234 is restricted on one end by the depth of compartment 240 (or alternatively, the maximum compression of spring 246) and on the other end by the contact between fastener 226 and bore 222. Fastener 226 is fastened to a tapped hole 258 formed in dropping gate 234. As shown in FIG. 26, mounting system 200 is preferably formed with a pair of bore 222/fastener 226 assemblies.

Dropping gate 234 drops into compartment 240 when a force great enough to compress spring 246 is exerted on dropping gate 234 or tab 248. In one embodiment, dropping gate 234 recedes into compartment 240 along a diagonal path, such that dropping gate 234 travels laterally along base 204 as the dropping gate recedes into the compartment. By traveling on a diagonal path, dropping gate 234 is more easily moved to the recesses position by a user; a user must reach under plate 202 and as such, the position of the user's hand encourages diagonal force as opposed to linear force on tab 248.

Figure 22:
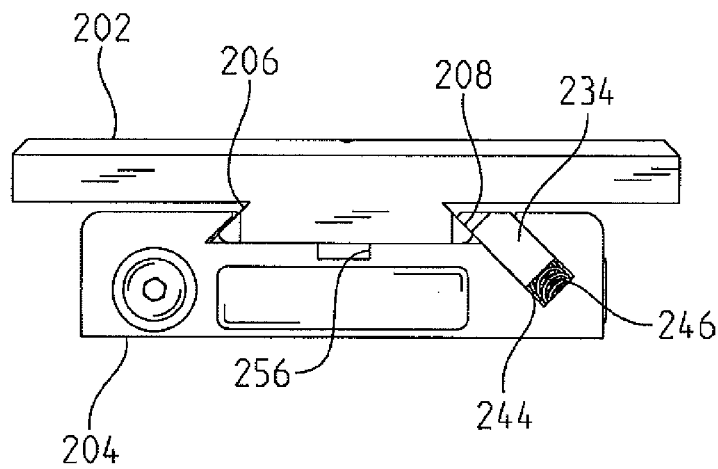
FIG. 22 is an end view of the mounting system of FIG. 19.
Figure 23:
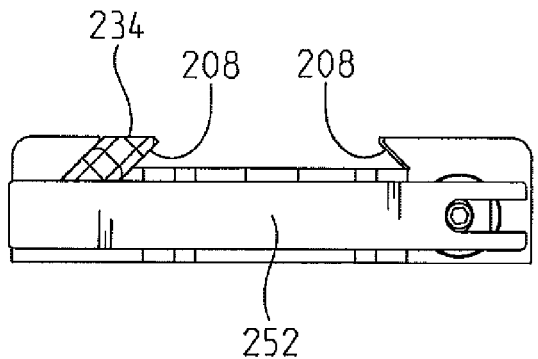
FIG. 23 is an end view of the mounting system of FIG. 20.
Figure 24:
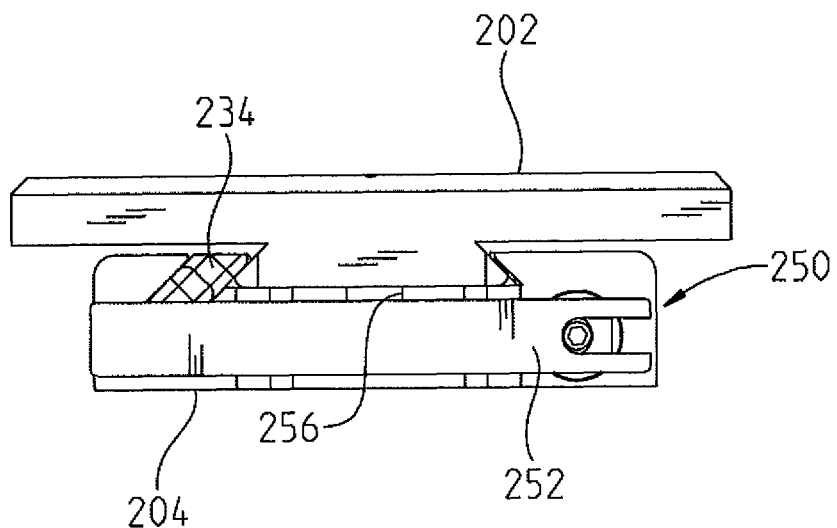
FIG. 24 is an end view of the mounting system of FIG. 19 with the clamp arm in the locked position.
Figure 25:
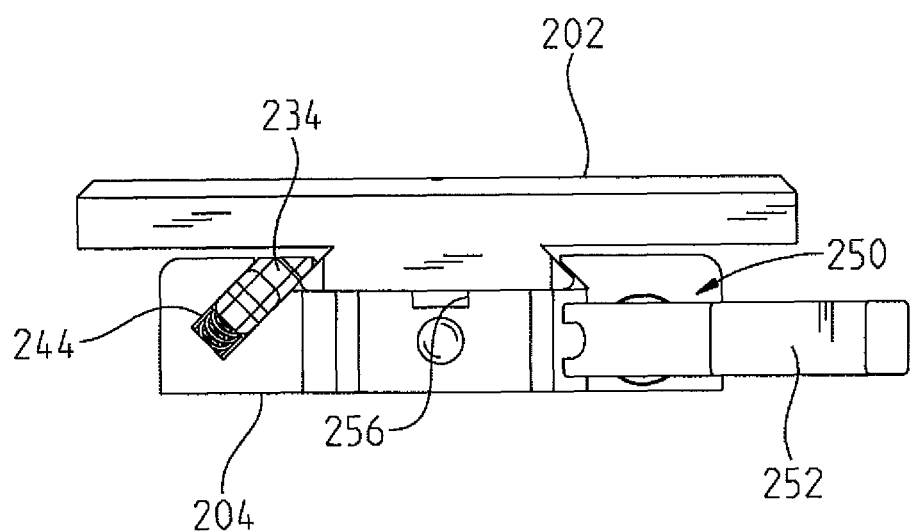
FIG. 25 is an end view of the mounting system of FIG. 19 with the clamp arm in the unlocked position.

With plate 202 installed on base 204, dropping gate 234 overlies tail 206, as shown in FIGS. 22, 24 and 25. Dropping gate 234 forms half of socket 208, such that tail 206 and socket 208 form a restrictive fit that limits movement of plate 202 relative to base 204 to linear travel along base 204. Such linear travel can be restricted by use of a clamp assembly 250, which holds plate 202 in a fixed position relative to base 204.

Figure 31:
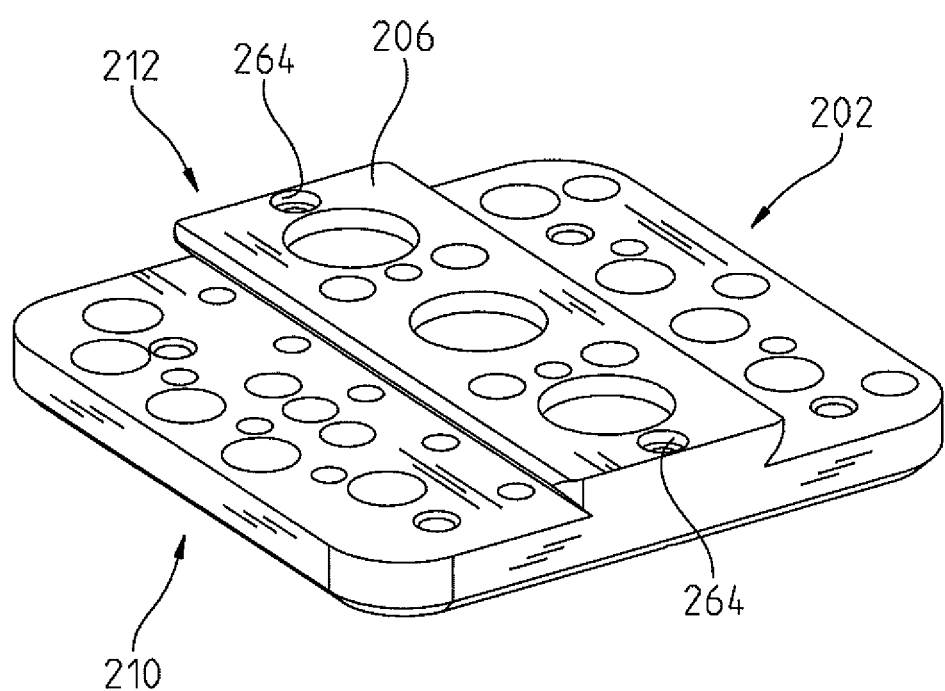
FIG. 31 is a perspective view of the underside of the plate of the mounting system of FIG. 19.

Referring to FIGS. 31 and 20, a tapped hole 264 is formed in the bottom surface of plate 202, preferably in the bottom surface of tail 206. A boss (not shown) extends from tapped hole 264 of plate 212. A channel 256 is formed in the top surface of base 204. With plate 202 in dovetailed contact with base 204, lateral movement of plate 202 is limited by boss contacting channel 256. Channel 256 is elongate, such as to allow limited travel of plate 202 along base 204. Channel 256 includes a terminal end beyond which boss cannot travel, with the terminal end forming an end-point to the travel of plate 202 along base 204. As such, with plate 202 seated on base 204, contact between boss and channel 256 serves to restrict the plate from sliding off the base. Tail 206 preferably includes two tapped holes 264, one proximate each end of tail 206, as shown in FIG. 31, with each tapped hole carrying a boss (not shown).

With tab 248 extending from one end of dropping gate 234, tab 248 will be positioned such that if plate 202 is large enough it will overlie all of base 204, such as is shown in FIG. 19; in such case tab 248 will be accessible and can be depressed to move dropping gate 234 to the recessed position to allow plate 202 to be removed from base 204. In one embodiment, a clamp arm 252 is formed as part of clamp assembly 250. In such embodiment, clamp arm 252 serves to tighten or loosen the associated clamp, wherein clamp arm 252 is movable between a locked and an unlocked position. When in the locked position, clamp arm 252 partially obstructs, or shields, access to tab 248, which helps to prevent tab 248 being depressed when the clamp is locked as seen in FIG. 27. Thereby, clamp arm 252 serves to help prevent plate 202 from being released from base 204 when the clamp arm is in the locked position.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A mounting system comprising:
a plate having a tail;
a base having a socket, said socket defined by a floor, a dropping gate, and a clamp wall, said dropping gate having a tab extending laterally from said gate beyond one end of said base, said gate having a first side being substantially parallel to said floor of said socket, a second side facing said socket and forming a portion of said socket, a third side substantially parallel to said first side, and a fourth side substantially parallel to said first side, said dropping gate is movable between an extended position and a recessed position, said recessed position defined as said dropping gate nested within a compartment formed in said base wherein said dropping gate first side is recessed at least to said floor, said gate being slidably retained in said compartment for facilitating movement of said dropping gate from its extended position into its recessed position, said tail forming a dovetailed-fit in said socket; and
a clamp apparatus is defined by a clamp body and a shaft, the clamp body biases between a clamped position and an unclamped position, a portion of said clamp wall is defined by a face of said clamp body, a ring is carried by said clamp body, said shaft is housed within a clamp bore formed in said base, said shaft includes a wedge cutout formed in an outer surface of said shaft, said ring makes camming contact with said wedge, thereby axial movement of said shaft biases said clamp body between said clamped and said unclamped position.

2. The mounting system of claim 1, wherein depressing said tab moves said dropping gate laterally relative said base as said dropping gate moves to said recessed position.

3. The mounting system of claim 1, and a clamp arm extending from said base, said clamp arm movable between an opened and a closed position and said clamp body is movable relative to said clamp wall.

4. The mounting system of claim 3, wherein said clamp arm shields said tab when said clamp arm is in said closed position.

5. The mounting system of claim 1, and a bore formed in said base,
a fastener having a head extending from said dropping gate, said head carried in said bore, wherein contact between said head and said bore prevents said dropping gate from advancing away from said base beyond said extended position.

6. The mounting system of claim 1, said floor of said socket including a channel extending inwardly into said socket and having a terminal end within said socket.

7. The mounting system of claim 6, and a boss extending from a bottom surface of said plate adapted for contacting said terminal end of said channel whereby the distance of lateral travel of said plate relative to said base is limited.

8. A mounting system comprising:
a plate having a tail;
a base having a socket, said socket defined by a floor, a dropping gate, and a clamp wall, said dropping gate having a tab extending laterally from said gate beyond one end of said base, said gate having a first side being substantially parallel to said floor of said socket, a second side facing said socket and forming a portion of said socket, a third side substantially parallel to said first side, and a fourth side substantially parallel to said first side, said dropping gate is movable between an extended position and a recessed position by pressing said tab toward said floor of said socket, said recessed position defined as said dropping gate nested within a compartment formed in said base wherein said dropping gate first side is recessed at least to said floor, said gate being slidably retained in said compartment for facilitating movement of said dropping gate from its extended position into its recessed position, said tail forming a dovetailed-fit in said socket, socket; and a clamp apparatus is defined by a clamp body and a shaft, the clamp body biases between a clamped position and an unclamped position, a portion of said clamp wall is defined by a face of said clamp body, a ring is carried by said clamp body, said shaft is housed within a clamp bore formed in said base, said shaft includes a wedge cutout formed in an outer surface of said shaft, said ring makes camming contact with said wedge, thereby axial movement of said shaft biases said clamp body between said clamped and said unclamped position.

9. The mounting system of claim 8, wherein depressing said tab moves said dropping gate laterally relative said base as said dropping gate moves to said recessed position.

10. The mounting system of claim 8, and a clamp arm extending from said base, said clamp arm movable between an opened and a closed position.

11. The mounting system of claim 10, wherein said clamp arm shields said tab when said clamp arm is in said closed position.

12. The mounting system of claim 8, and a bore formed in said base,
a fastener having a head extending from said dropping gate, said head carried in said bore, wherein contact between said head and said bore prevents said dropping gate from advancing away from said base beyond said extended position.

13. The mounting system of claim 8, said floor of said socket including a channel extending inwardly into said socket and having a terminal end within said socket.

14. The mounting system of claim 13, and a boss extending from a bottom surface of said plate adapted for contacting said terminal end of said channel whereby the distance of lateral travel of said plate relative to said base is limited.

* * * * *